US012741377B2

(12) United States Patent
Shirai et al.

(10) Patent No.: US 12,741,377 B2
(45) Date of Patent: Sep. 22, 2026

(54) SYSTEM AND METHOD SUITABLE FOR CONTROLLING A ROBOT USING A HIERARCHICAL OPTIMIZATION FRAMEWORK

(71) Applicant: Mitsubishi Electric Research Laboratories, Inc., Cambridge, MA (US)

(72) Inventors: Yuki Shirai, Cambridge, MA (US); Arvind Raghunathan, Cambridge, MA (US); Devesh Jha, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 4 days.

(21) Appl. No.: 19/074,973

(22) Filed: Mar. 10, 2025

(65) Prior Publication Data

US 2026/0264236 A1 Sep. 10, 2026

(51) Int. Cl.
*G06F 17/00* (2019.01)
*B25J 9/16* (2006.01)
*G06F 17/11* (2006.01)

(52) U.S. Cl.
CPC ............. *B25J 9/1664* (2013.01); *G06F 17/11* (2013.01)

(58) Field of Classification Search
CPC ................................ B25J 9/1664; G06F 17/11
USPC .......................................................... 700/245
See application file for complete search history.

(56) References Cited

U.S. PATENT DOCUMENTS 11,565,406 B2 * 1/2023 Yerazunis ................ B25J 15/12
11,685,058 B2 * 6/2023 Yerazunis ................ B25J 15/10 700/246
2022/0161427 A1 * 5/2022 Yerazunis .............. B25J 9/1674
2022/0161444 A1 * 5/2022 Yerazunis ................ B25J 9/104
2024/0157565 A1 * 5/2024 Coats ..................... B25J 9/1697

FOREIGN PATENT DOCUMENTS

JP 2024537129 A * 10/2024 .......... B25J 15/0616
WO WO-2022051329 A1 * 3/2022 ............. B62D 53/08

OTHER PUBLICATIONS

A Quasi-static Model and Simulation Approach for Pushing, Grasping, and Jamming (Year: 2024).*

* cited by examiner

*Primary Examiner* — Ronnie M Mancho
(74) *Attorney, Agent, or Firm* — Gene Vinokur

(57) ABSTRACT

The present disclosure provides a system and a method for controlling a robot to execute a manipulation task of manipulating an object. The method includes determining, based on an initial pose and a target pose of the object, a kinematically feasible trajectory of pose of the object and extrinsic contact points between the object and an environment for different poses of the object while satisfying a collision constraint. The method further includes refining the kinematically feasible trajectory by introducing contact forces the robot applies to surfaces of the object and using extrinsic contact points between the object and the environment. The method further includes determining an optimal trajectory by further refining the refined trajectory provided by incorporating nonlinear dynamic constraints and sticking-sliding complementarity constraints, controlling the robot based on the optimal trajectory to execute the manipulation task.

20 Claims, 14 Drawing Sheets

SYSTEM AND METHOD SUITABLE FOR CONTROLLING A ROBOT USING A HIERARCHICAL OPTIMIZATION FRAMEWORK

TECHNICAL FIELD

The present disclosure relates generally to control systems, and more specifically to a system and a method suitable for controlling a robot to execute a manipulation task, using a hierarchical optimization framework.

BACKGROUND

Robotic systems are designed to perform manipulation tasks, such as moving an object from an initial pose to a target pose. The robotic system, for example, includes a robotic arm holding a tool to manipulate the object and move the object to the target pose. The manipulation of the object with the tool leads to multiple contact formations, for example, a contact between the robotic arm and the tool, a contact between the tool and the object, and a contact between the object and an environment.

Robotic manipulation planners are used to determine a trajectory for executing the manipulation task. However, determining the trajectory for such a contact rich manipulation task is challenging. For instance, the robotic manipulation planners need to account for long-horizon manipulation tasks, where multi-modal, complex behavior must be planned in advance. This leads to large-scale optimization problems that are computationally expensive and difficult to solve. Further, the robotic manipulation planners consider kinematic, dynamic, and contact constraints of both the robotic system and the object being manipulated. These constraints are nonlinear and discontinuous, requiring sophisticated methods to find feasible and meaningful solutions. Furthermore, attempting to consider all possible contact configurations results in overwhelming computational costs.

Therefore, there is a need for a computationally efficient system and method for controlling the robot to perform the manipulation task.

SUMMARY

It is an objective of some embodiments to provide a system and a method for controlling a robot to execute a task with reduced computation complexity. The robot includes a robotic arm or a robotic manipulator which is configured to execute the task. The task includes, for example, one or a combination of pushing an object to a target location, stacking of objects, and aligning of the objects. For example, the robot is a placement robot and the task of the robot is to place different objects within specified positions in a box or a delivery carton. For the purpose of explanation, the robot is considered to be the robotic manipulator and the task of the robotic manipulator is to manipulate the object to a target pose from an initial pose. The target pose, for example, includes a target location and/or a target orientation of the object. The initial pose, for example, includes an initial location and/or an initial orientation of the object. In some embodiments, such a manipulation task can be executed by multiple robots, i.e., the object is manipulated to the target pose by the multiple robots. For the ease of explanation, the present disclosure considers that the manipulation task is executed by the single robot.

The manipulation of the object to the target pose leads to multiple contact formations, for example, contacts and between the robot and the object, and a contact between the object and an environment. It is an object of some embodiments to design an optimal control problem for controlling the robot to perform such a contact-rich manipulation task.

Some embodiments are based on the recognition that trajectories for the manipulation of the object through the contacts can be determined by formulating a trajectory optimization problem using all possible contact constraints. Such a formulation results in a large-scale optimal control problem, e.g., Mixed-Integer Nonlinear Program (MINLP) which is computationally expensive and difficult to solve. Further, the MINLP must consider kinematic, dynamic, and contact constraints of both the robot and the object it manipulates. These constraints are nonlinear and discontinuous, requiring sophisticated methods to find feasible solutions.

To mitigate such problems, some embodiments of the present disclosure propose a hierarchical optimization framework that leverages segmentation to tackle complexities of the contact-rich manipulation task. By segmenting original, highly complex MNILP into smaller, more manageable sub-problems, the hierarchical optimization framework addresses each challenge in a sequential, structured manner. The segmentation transforms a globally nonlinear, mixed-integer non-convex optimization formulation into a series of smaller, computationally tractable tasks. The hierarchical optimization framework not only simplifies the trajectory optimization problem but also ensures that critical aspects such as nonlinear manipulation dynamics, contact dynamics, and sticking-sliding complementarity are addressed progressively, allowing the robot to handle dexterous, multi-modal manipulation tasks effectively.

The hierarchical optimization framework is segmented into three hierarchical stages: Kinematics Trajectory Optimization (K-TRAJOPT), Contact Trajectory Optimization (C-TRAJOPT), and Quasi-static Trajectory Optimization (Q-TRAJOPT). Each of these stages of the hierarchical optimization framework is explained below.

Based on the initial pose and the target pose of the object, the K-TRAJOPT determines a feasible trajectory of pose of the object and extrinsic contact points and between the object and the environment for different poses of the object while satisfying collision constraints. The collision constraints avoids collision between the object and the environment. The feasible trajectory of pose of the object includes a pose of the object at different time steps, $t=0, 1, 2, \ldots, T$. The pose of the object includes one or both of a location and an orientation of the object.

The K-TRAJOPT simplifies the optimal control problem by ignoring detailed dynamic constraints and contact dynamics, thereby solving the K-TRAJOPT as a nonlinear program (NLP) that does not involve integer decision variables. The determined feasible trajectory of the pose of the object and the extrinsic contact points between the object and the environment serve as inputs for the next stage, i.e., C-TRAJOPT. The K-TRAJOPT stage ensures that subsequent stages have a significantly reduced search space, making the optimal control problem computationally efficient.

Based on the feasible trajectory of the pose of the object and the extrinsic contact points between the object and the environment, the C-TRAJOPT determines, for each time step, extrinsic contact forces corresponding to the extrinsic contact points, object surfaces where the robot makes contact, robot contact points between the robot and the object, and robot contact forces at the robot contact points.

The C-TRAJOPT reframes the optimal control problem as a mixed-integer non-convex optimization program, which can be further simplified into a mixed-integer linear program (MILP) using convex relaxations, resulting in decrease in computation dramatically while achieving better quality of approximation of nonlinear dynamics of the robot. The C-TRAJOPT stage balances computational efficiency and precision by focusing on approximate dynamic constraints while reducing nonlinearities.

Outputs of the C-TRAJOPT, i.e. the extrinsic contact forces corresponding to the extrinsic contact points, the object surfaces where the robot makes contact, the robot contact points between the robot and the object, and the robot contact forces at the robot contact points, are used as inputs for the final stage, i.e., the Q-TRAJOPT.

The Q-TRAJOPT refines the outputs of the C-TRAJOPT. In an embodiment, the Q-TRAJOPT determines, for each time step, optimal outputs including optimal extrinsic contact forces, optimal robot contact points between the robot and the object, optimal robot contact forces at the optimal robot contact points, and optimal object pose, while keeping the object surfaces where the robot makes contact fixed and satisfying nonlinear dynamic and kinematic constraints and sliding-sticking complementarity constraints.

In the Q-TRAJOPT, the object surfaces where the robot makes contact are fixed but the sliding-sticking complementarity constraints are still considered. Therefore, the Q-TRAJOPT has flexibility to adjust the robot contact points such that it can find much richer solutions resulting in more dexterous behavior. Building on the outputs provided by the C-TRAJOPT, the Q-TRAJOPT focuses on local nonlinearities, such as sticking-sliding interactions and moving robot contact forces. This localized approach avoids complexity of solving the optimal control problem globally while ensuring physical realism and feasibility. The result is a high-precision optimal outputs that minimizes drift, instability, or inefficiency, making it suitable for real-world implementation.

Further, based on the optimal outputs determined by the Q-TRAJOPT, control commands to actuators of the robot are determined. The control commands, for example, includes a velocity, an orientation, and a position of the robot. The robot is controlled according to the determined control commands to manipulate the object to the target pose.

By decomposing the optimal control problem of the robot into the three hierarchical stages—the K-TRAJOPT, the C-TRAJOPT, and the Q-TRAJOPT, the hierarchical optimization framework achieves a balance between computational tractability and physical accuracy. Each stage builds on the previous one, progressively introducing complexity and refining the output. Such a layered approach not only simplifies the optimal control problem but also exemplifies principles of efficient problem-solving, enabling the robot to perform dexterous, multi-modal manipulation tasks that are otherwise computationally infeasible.

Accordingly, one embodiment discloses a controller for controlling a robot to execute a task of reaching a target state in an environment. The controller comprises an input interface configured to receive an initial pose and the target pose of the object, and a memory configured to store modules of a hierarchical optimization framework. The modules of the hierarchical optimization framework comprising: a kinematics trajectory optimization (K-TRAJOPT) module configured to determine, based on the initial pose and the target pose of the object, a kinematically feasible trajectory of pose of the object and extrinsic contact points between the object and an environment for different poses of the object while satisfying a collision constraint; a contact trajectory optimization (C-TRAJOPT) module configured to refine the kinematically feasible trajectory by introducing contact forces the robot applies to surfaces of the object and using extrinsic contact points between the object and the environment; and a quasi-static trajectory optimization (Q-TRAJOPT) module configured determine an optimal trajectory by further refining the refined trajectory provided by the C-TRAJOPT module, by incorporating nonlinear dynamic constraints and sticking-sliding complementarity constraints. The controller further comprises a processor configured to: execute the modules of the hierarchical optimization framework to obtain the optimal trajectory for executing the manipulation task; produce control commands for actuators of the robot based on the optimal trajectory; and operate the actuators of the robot according to the produced control commands by transmitting the control commands to the robot, to execute the manipulation task.

Accordingly, another embodiment discloses a method for controlling a robot to execute a manipulation task of manipulating an object to a target pose. The method comprises receiving an initial pose and the target pose of the object; determining, based on the initial pose and the target pose of the object, a kinematically feasible trajectory of pose of the object and extrinsic contact points between the object and an environment for different poses of the object while satisfying a collision constraint; refining the kinematically feasible trajectory by introducing contact forces the robot applies to surfaces of the object and using extrinsic contact points between the object and the environment; determining an optimal trajectory by further refining the refined trajectory, by incorporating nonlinear dynamic constraints and sticking-sliding complementarity constraints; producing control commands for actuators of the robot based on the optimal trajectory; and operating the actuators of the robot according to the produced control commands by transmitting the control commands to the robot, to execute the manipulation task.

Accordingly, yet another embodiment discloses a non-transitory computer-readable storage medium embodied thereon a program executable by a processor for performing a method controlling a robot to execute a manipulation task of manipulating an object to a target pose. The method comprises receiving an initial pose and the target pose of the object; determining, based on the initial pose and the target pose of the object, a kinematically feasible trajectory of pose of the object and extrinsic contact points between the object and an environment for different poses of the object while satisfying a collision constraint; refining the kinematically feasible trajectory by introducing contact forces the robot applies to surfaces of the object and using extrinsic contact points between the object and the environment; determining an optimal trajectory by further refining the refined trajectory, by incorporating nonlinear dynamic constraints and sticking-sliding complementarity constraints; producing control commands for actuators of the robot based on the optimal trajectory; and operating the actuators of the robot according to the produced control commands by transmitting the control commands to the robot, to execute the manipulation task.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
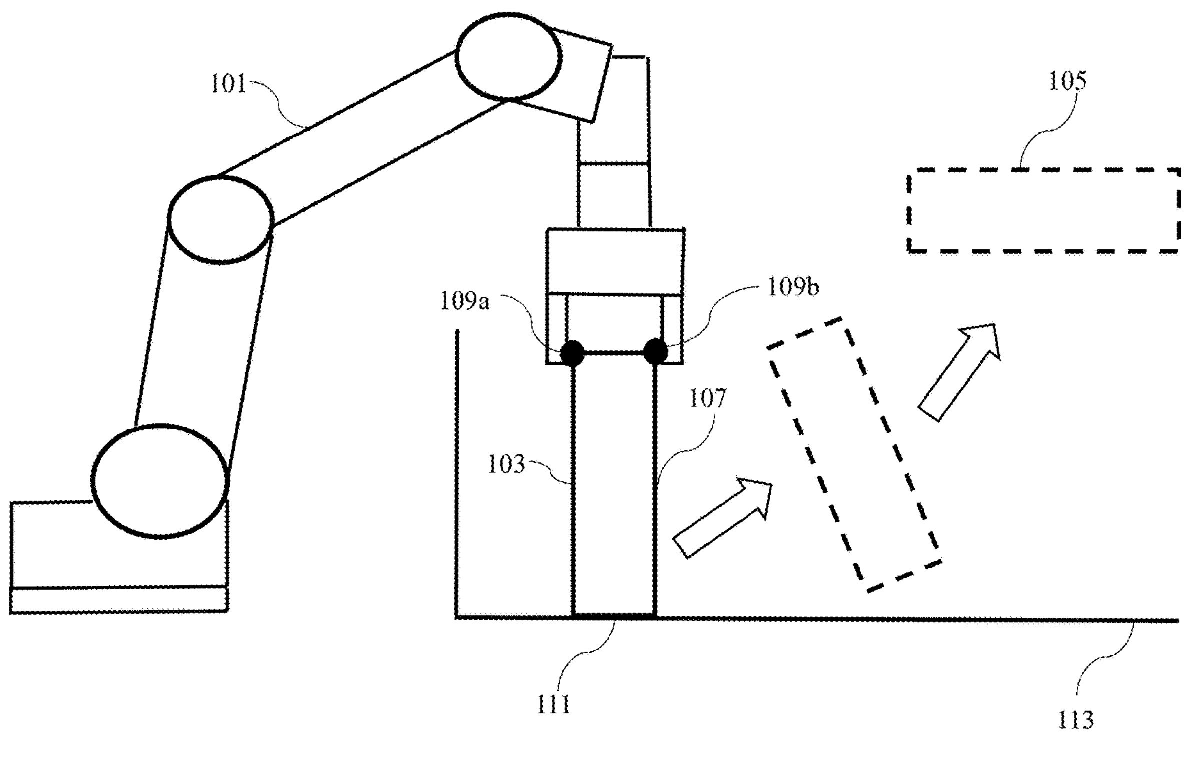
FIG. 1A illustrates a robot configured to perform a task, according to an embodiment of the present disclosure.

FIG. 1A illustrates a robot 101 configured to perform a task, according to an embodiment of the present disclosure. The robot 101 includes a robotic arm or a robotic manipulator which is configured to execute the task. The task includes, for example, one or a combination of pushing an object 103 to a target location, stacking of objects, and aligning of the objects. For example, the robot 101 is a placement robot and the task of the robot 101 is to place different objects within specified positions in a box or a delivery carton. For the purpose of explanation, the robot 101 is considered to be the robotic manipulator and the task of the robotic manipulator is to manipulate the object 103 to a target pose 105 from an initial pose 107. The target pose 105, for example, includes a target location and/or a target orientation of the object 103. The initial pose 107, for example, includes an initial location and/or an initial orientation of the object 103. In some embodiments, such a manipulation task can be executed by multiple robots, i.e., the object 103 is manipulated to the target pose 105 by the multiple robots. For the ease of explanation, the present disclosure considers that the manipulation task is executed by the single robot 101.

The manipulation of the object 103 to the target pose 105 leads to multiple contact formations, for example, contacts 109*a* and 109*b* between the robot 101 and the object 103, and a contact 111 between the object 103 and an environment 113. It is an object of some embodiments to design an optimal control problem for controlling the robot 101 to perform such a contact-rich manipulation task.

Figure 1B:
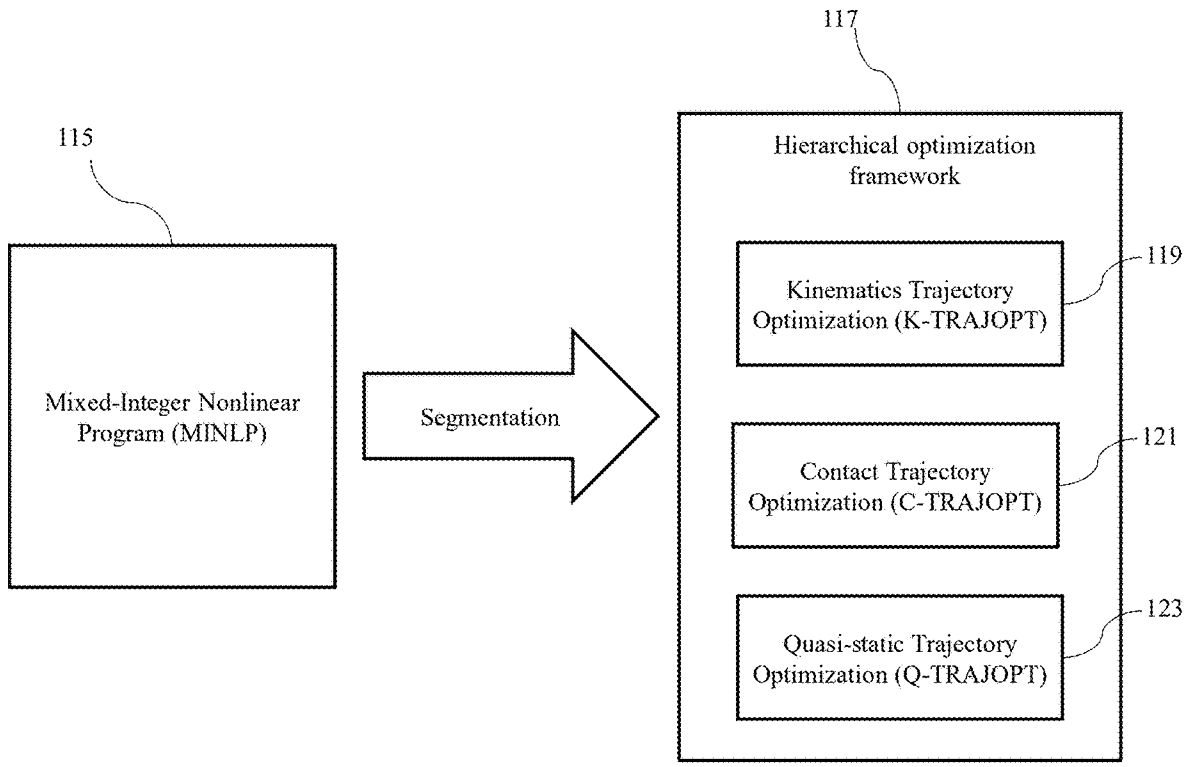
FIG. 1B shows a schematic of principles used for designing an optimal control problem for controlling the robot to perform a contact-rich manipulation task, according to an embodiment of the present disclosure.

FIG. 1B shows a schematic of principles used for designing the optimal control problem for controlling the robot 101 to perform the contact-rich manipulation task, according to an embodiment of the present disclosure. Some embodiments are based on the recognition that trajectories for the manipulation of the object 103 through the contacts 109*a*, 109*b*, and 111 can be determined by formulating a trajectory optimization problem using all possible contact constraints. Such a formulation results in a large-scale optimal control problem, e.g., Mixed-Integer Nonlinear Program (MINLP) 115 which is computationally expensive and difficult to solve. Further, the MINLP 115 must consider kinematic, dynamic, and contact constraints of both the robot 101 and the object 103 it manipulates. These constraints are nonlinear and discontinuous, requiring sophisticated methods to find feasible solutions.

To mitigate such problems, some embodiments of the present disclosure propose a hierarchical optimization framework 117 that leverages segmentation to tackle complexities of the contact-rich manipulation task. By segmenting original, highly complex MINLP 115 into smaller, more manageable sub-problems, the hierarchical optimization framework addresses each challenge in a sequential, structured manner. The segmentation transforms a globally nonlinear, mixed-integer non-convex optimization formulation into a series of smaller, computationally tractable tasks. The hierarchical optimization framework 117 not only simplifies the trajectory optimization problem but also ensures that critical aspects such as nonlinear manipulation dynamics, contact dynamics, and sticking-sliding complementarity are addressed progressively, allowing the robot 101 to handle dexterous, multi-modal manipulation tasks effectively.

The hierarchical optimization framework 117 is segmented into three hierarchical stages: Kinematics Trajectory Optimization (K-TRAJOPT) 119, Contact Trajectory Optimization (C-TRAJOPT) 121, and Quasi-static Trajectory Optimization (Q-TRAJOPT) 123. Each of these stages of the hierarchical optimization framework 117 is explained below.

Figure 1C:
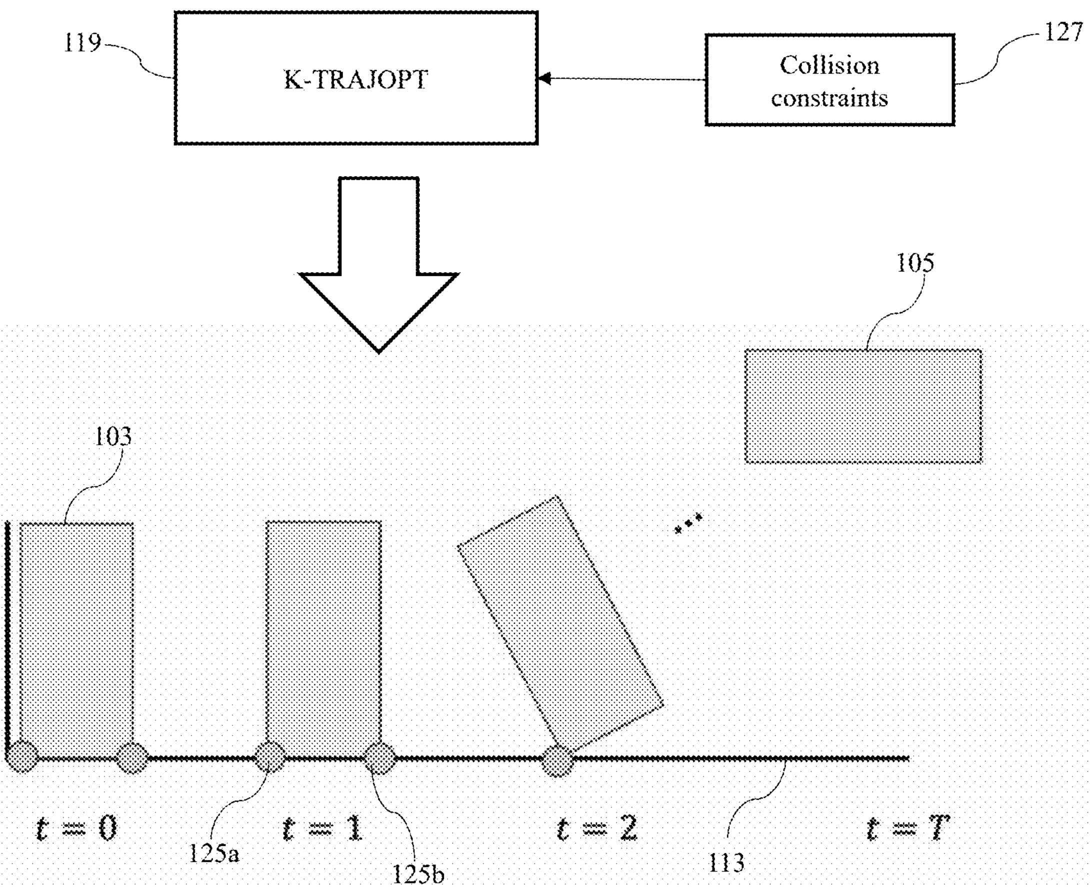
FIG. 1C illustrates a Kinematics Trajectory Optimization (K-TRAJOPT) stage of a hierarchical optimization framework, according to an embodiment of the present disclosure.

FIG. 1C illustrates the K-TRAJOPT 119 stage of the hierarchical optimization framework 117, according to an embodiment of the present disclosure. Based on the initial pose 107 and the target pose 105 of the object 103, the K-TRAJOPT 119 determines a feasible trajectory of pose of the object 103 and extrinsic contact points 125*a* and 125*b* between the object 103 and the environment 113 for different poses of the object 103 while satisfying collision constraints 127. The collision constraints 127 avoid collision between the object 103 and the environment 113. The feasible trajectory of pose of the object 103 includes a pose of the object 103 at different time steps, t=0, 1, 2, . . . , T. The pose of the object 103 includes one or both of a location and an orientation of the object 103.

The K-TRAJOPT 119 simplifies the optimal control problem by ignoring detailed dynamic constraints and contact dynamics, thereby solving the K-TRAJOPT 119 as a nonlinear program (NLP) that does not involve integer decision variables. The determined feasible trajectory of the pose of the object 103 and the extrinsic contact points between the object 103 and the environment 113 serve as inputs for the next stage, i.e., C-TRAJOPT 121. The K-TRAJOPT 119 stage ensures that subsequent stages have a significantly reduced search space, making the optimal control problem computationally efficient.

Figure 1D:
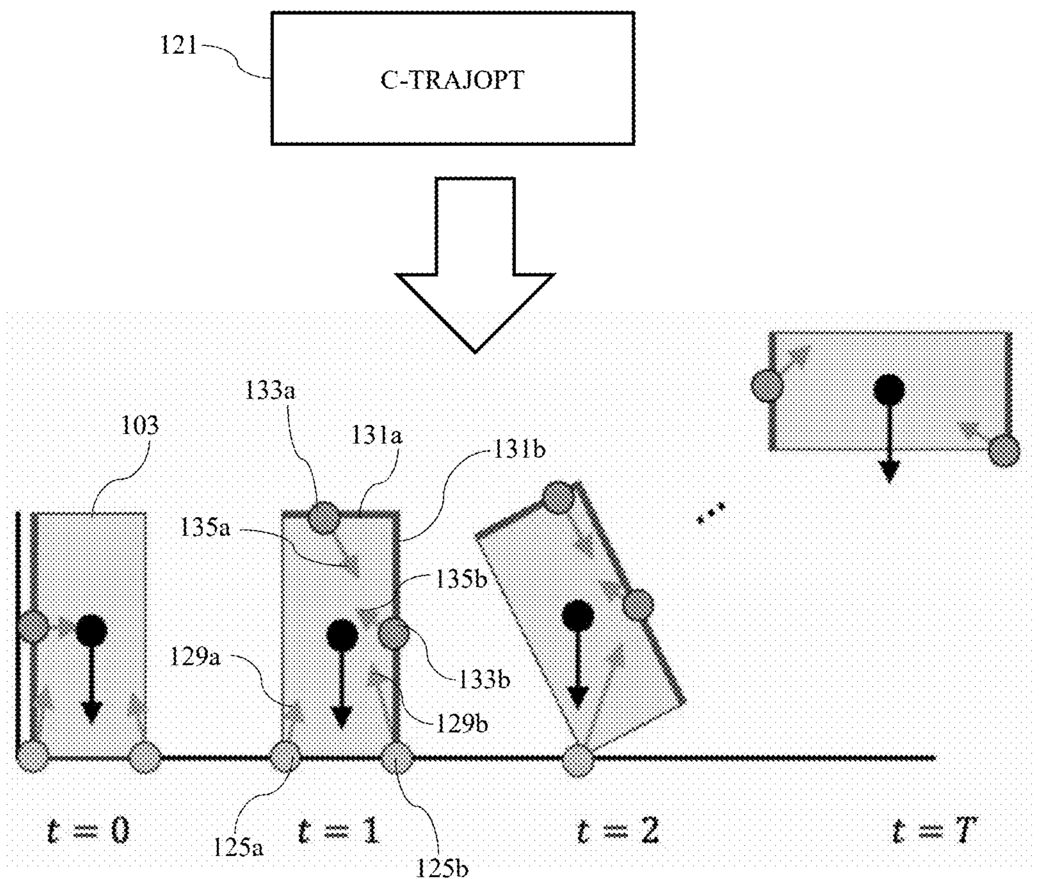
FIG. 1D illustrates a Contact Trajectory Optimization (C-TRAJOPT) stage of the hierarchical optimization framework, according to an embodiment of the present disclosure.

FIG. 1D illustrates the C-TRAJOPT 121 stage of the hierarchical optimization framework 117, according to an embodiment of the present disclosure. Based on the feasible trajectory of the pose of the object 103 and the extrinsic contact points between the object 103 and the environment 113, the C-TRAJOPT 121 determines, for each time step, extrinsic contact forces corresponding to the extrinsic contact points, object surfaces where the robot 101 makes contact (represented by thicker edges of the object 103), robot contact points between the robot 101 and the object 103 (represented by darker shade dots on the thicker edges of the object 103), and robot contact forces at the robot contact points. For instance, based on the feasible trajectory of the pose of the object 103 and the extrinsic contact points 125*a* and 125*b* between the object 103 and the environment 113, the C-TRAJOPT 121 determines extrinsic contact forces 129*a* and 129*b* corresponding to the extrinsic contact points 125*a* and 125*b*, respectively, object surfaces 131*a*, 131*b* where the robot 101 makes contact, robot contact points 133*a*, 133*b* between the robot 101 and the object 103, and robot contact forces 135*a* and 135*b* at the robot contact points 133*a* and 133*b*, respectively.

The C-TRAJOPT 121 reframes the optimal control problem as a mixed-integer non-convex optimization program, which can be further simplified into a mixed-integer linear program (MILP) using convex relaxations, resulting in decrease in computation dramatically while achieving better quality of approximation of nonlinear dynamics of the robot 101. The C-TRAJOPT 121 stage balances computational efficiency and precision by focusing on approximate dynamic constraints while reducing nonlinearities.

Outputs of the C-TRAJOPT 121, i.e. the extrinsic contact forces corresponding to the extrinsic contact points, the object surfaces where the robot 101 makes contact, the robot contact points between the robot 101 and the object 103, and the robot contact forces at the robot contact points, are used as inputs for the final stage, i.e., the Q-TRAJOPT 123.

Figure 1E:
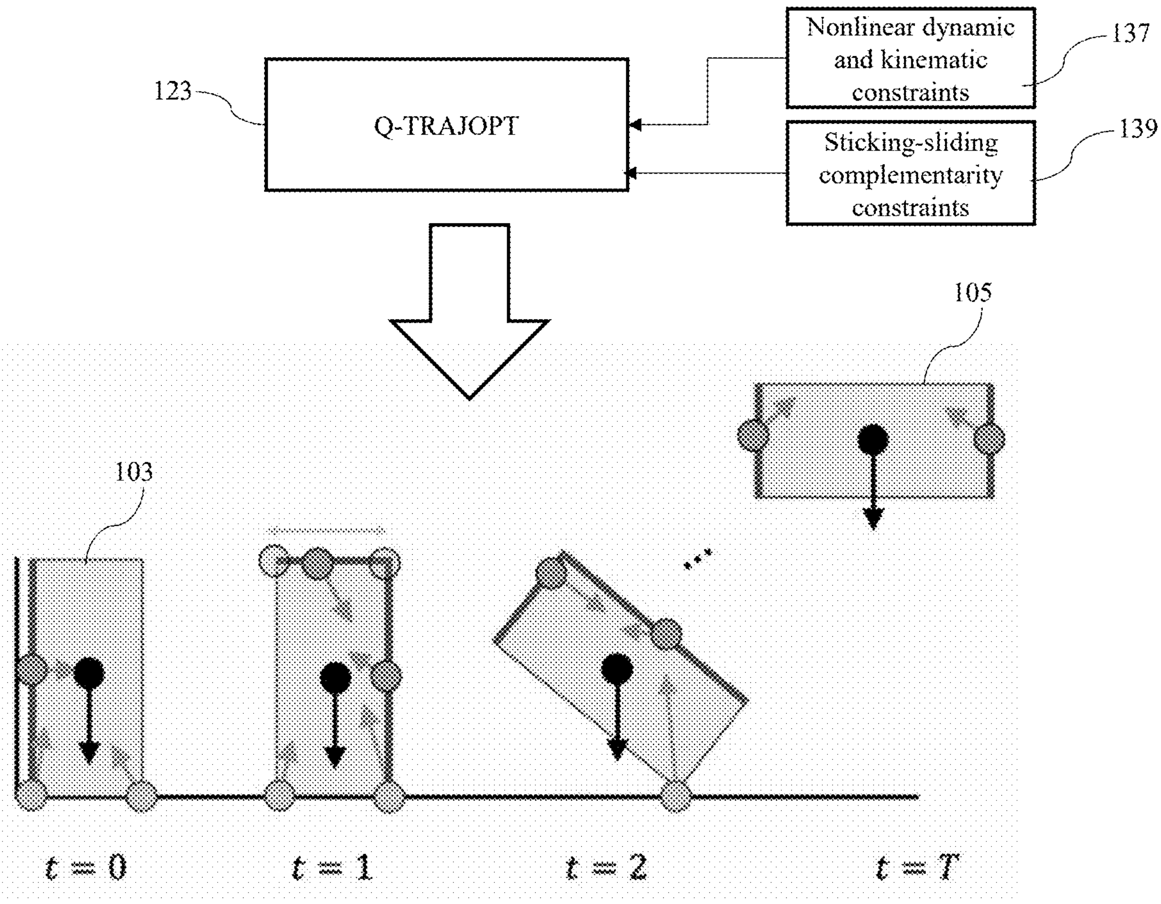
FIG. 1E illustrates a Quasi-static Trajectory Optimization (Q-TRAJOPT) stage of the hierarchical optimization framework, according to an embodiment of the present disclosure.

FIG. 1E illustrates the Q-TRAJOPT 123 stage of the hierarchical optimization framework 117, according to an embodiment of the present disclosure. The Q-TRAJOPT 123 refines the outputs of the C-TRAJOPT 121. In an embodiment, the Q-TRAJOPT 123 determines, for each time step, optimal outputs including optimal extrinsic contact forces, optimal robot contact points between the robot 101 and the object 103 (represented by darker shade dots on the thicker edges of the object 103), optimal robot contact forces at the optimal robot contact points, and optimal object pose, while keeping the object surfaces where the robot 101 makes contact fixed and satisfying nonlinear dynamic and kinematic constraints 137 and sliding-sticking complementarity constraints 139. The sticking-sliding complementarity constraints 139 model and enforce interactions between the robot 101 and its environment, particularly when there is contact between the robot 101 and the object 103.

In the Q-TRAJOPT 123, the object surfaces where the robot 101 makes contact are fixed but the sliding-sticking complementarity constraints 139 are still considered. Therefore, the Q-TRAJOPT 123 has flexibility to adjust the robot contact points such that it can find much richer solutions resulting in more dexterous behavior. Building on the outputs provided by the C-TRAJOPT 121, the Q-TRAJOPT 123 focuses on local nonlinearities, such as sticking-sliding interactions and moving robot contact forces. This localized approach avoids complexity of solving the optimal control problem globally while ensuring physical realism and feasibility. The result is a high-precision optimal outputs that minimizes drift, instability, or inefficiency, making it suitable for real-world implementation.

Further, based on the optimal outputs determined by the Q-TRAJOPT 123, control commands to actuators of the robot 101 are determined. The control commands, for example, includes a velocity, an orientation, and a position of the robot. The robot 101 is controlled according to the determined control commands to manipulate the object 103 to the target pose 105.

By decomposing the optimal control problem of the robot 101 into the three hierarchical stages—the K-TRAJOPT 119, the C-TRAJOPT 121, and the Q-TRAJOPT 123, the hierarchical optimization framework 117 achieves a balance between computational tractability and physical accuracy. Each stage builds on the previous one, progressively introducing complexity and refining the output. Such a layered approach not only simplifies the optimal control problem but also exemplifies principles of efficient problem-solving, enabling the robot 101 to perform dexterous, multi-modal manipulation tasks that are otherwise computationally infeasible.

Figure 2:
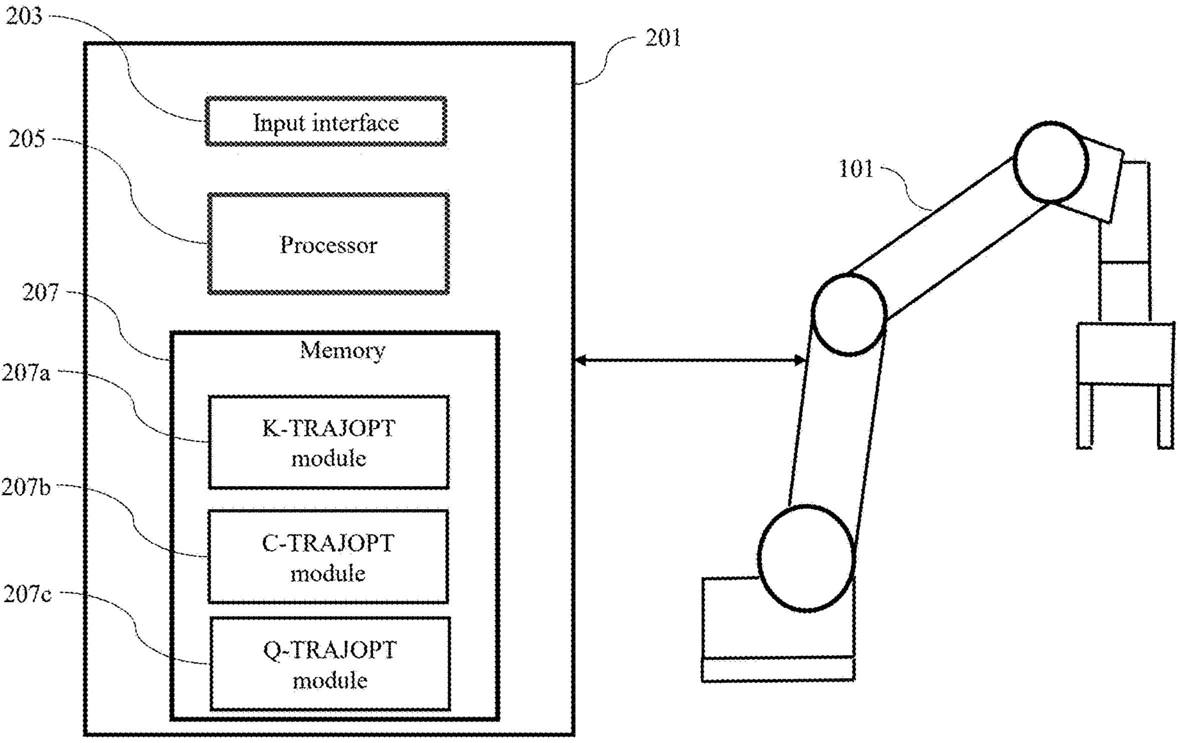
FIG. 2 illustrates a block diagram of a controller for controlling the robot to execute a manipulation task, according to some embodiments of the present disclosure.

FIG. 2 illustrates a block diagram of a controller 201 for controlling the robot 101 to execute the manipulation task, according to some embodiments of the present disclosure. The controller 201 is communicatively coupled to the robot 101. In some embodiments, the controller 201 is integrated into the robot 101. The controller 201 is configured to control the robot 101 to execute the manipulation task to manipulate the object 103 to the target pose 105. The controller 201 includes an input interface 203, a processor 205, and a memory 207. The input interface 203 configured to receive the initial pose 107 and the target pose 105 of the object 103. The processor 205 may be a single core processor, a multi-core processor, a computing cluster, or any number of other configurations. The memory 207 may include random access memory (RAM), read only memory (ROM), flash memory, or any other suitable memory systems. Additionally, in some embodiments, the memory 207 may be implemented using a hard drive, an optical drive, a thumb drive, an array of drives, or any combinations thereof.

Further, the memory 207 is configured to store modules of the hierarchical optimization framework 117. The modules of the hierarchical optimization framework comprise a K-TRAJOPT module 207*a* including computer executable instructions corresponding to the K-TRAJOPT 119, a C-TRAJOPT module 207*b* including computer executable instructions corresponding to the K-TRAJOPT 121, and a Q-TRAJOPT module 207*c* including computer executable instructions corresponding to the Q-TRAJOPT 123 explained above. The processor 205 is configured to execute the K-TRAJOPT module 207*a*, the C-TRAJOPT module 207*b*, and the Q-TRAJOPT module 207*c* of the hierarchical optimization framework 117 to obtain an optimal trajectory for executing the manipulation task.

The K-TRAJOPT module 207*a* is configured to determine, based on the initial pose 107 and the target pose 105 of the object, a kinematically feasible trajectory of the pose of the object 103 and the extrinsic contact points (e.g., points 125*a* and 125*b*) between the object 103 and the environment 111 for different poses of the object while satisfying the collision constraints 127. The kinematically feasible trajectory of kinematically feasible trajectory pose of the object 103 at the different time steps.

The C-TRAJOPT module 207*b* is configured to refine the kinematically feasible trajectory by introducing contact forces the robot 101 applies to surfaces of the object (e.g., the robot contact forces 135*a* and 135*b* at the robot contact points 133*a* and 133*b*, respectively) and using the extrinsic contact points between the object 103 and the environment 113.

The Q-TRAJOPT module 207*c* is configured to determine an optimal trajectory by further refining the refined trajectory provided by the C-TRAJOPT module 207*b* by incorporating the nonlinear dynamic constraints 137 and the sticking-sliding complementarity constraints 139. The optimal trajectory includes the optimal outputs, for each time step, including the optimal extrinsic contact forces, the optimal robot contact points between the robot 101 and the object 103, the optimal robot contact forces at the optimal robot contact points, and the optimal object pose.

The processor 205 is configured to produce the control commands for the actuators of the robot based on the optimal trajectory. The processor 205 is further configured to operate the actuators of the robot according to the produced control commands by transmitting the control commands to the robot, to execute the manipulation task.

In such a manner, the processor 205 controls the robot 101 based on the hierarchical optimization framework 117 to execute the manipulation task. The three hierarchical stages of the hierarchical optimization framework 117—the K-TRAJOPT 119, the C-TRAJOPT 121, and the Q-TRAJOPT 123 are mathematically described below.

Problem Formulation:

Tabular column summarizes variables used in the present disclosure.

| Name | Description | Size | C/B | Σ |
|---|---|---|---|---|
| $q_t$ | object pose | $\mathbb{R}^3$ | C | W |
| $p_t^i$ | i-th robot position | $\mathbb{R}^2$ | C | W |
| $e_t^v$ | v-th extrinsic contact position | $\mathbb{R}^2$ | C | W |
| $u_t^i$ | i-th robot contact force | $\mathbb{R}^2$ | C | W |
| $\lambda_t^{i,p}$ | p-th local force for i-th robot | $\mathbb{R}^2$ | C | p |
| $f_t^v$ | v-th extrinsic contact force | $\mathbb{R}^2$ | C | W |
| $z_t^{i,p}$ | i-th robot contact at $\mathcal{P}_p$ | $\mathbb{Z}^1$ | B | |

The present disclosure considers total $N_r$ robots (e.g., robot 101) and a single object (e.g., 103) which includes $N_v$ potential extrinsic contacts and $N_p$ potential object surfaces where the robot can make contact. $\mathcal{P}_p$ denotes as p-th object surface, associated with a local frame $\Sigma_p$. $\mathcal{P}_p$ is represented as halfspace. For any arbitrary vector x, notation $$\|x\|_Q^2$$

means a quadratic term with a positive-semi-definite matrix Q. Coordinate transformation and rotation matrix from frame $\Sigma_A$ to $\Sigma_B$ are defined as $${}^A_B T$$

and $${}^A_B R,$$

respectively. X⇒Y denotes a conditional constraint and implement it using a big-M formulation in a mix integer problem (MIP).

Constants m and $g \in \mathbb{R}^2$ represent a mass of the object and gravitational acceleration, defined in world frame $\Sigma_w$, respectively.

$$\mu_e^v$$

and $$\mu_r^i$$

are friction constraints for v-th extrinsic contact and i-th robot contact, respectively. h is a step size. Subscripts n and s represent normal and tangential elements of forces. Also, subscripts x, y, θ, are used to represent element of $q_t$.

K-TRAJOPT

An objective of the K-TRAJOPT 119 is determine the feasible trajectory of the pose of the object 103 and the extrinsic contact points between the object 103 and the environment 113. The K-TRAJOPT 119 considers a following optimization problem.

$$\min_{q_t, \dot{q}_t} \sum_{t=0}^{T} \|q_t - q_t^{ref}\|_{Q_{kin}}^2 \tag{1}$$

$$\text{s.t., } q_{t+1} = q_t + h\dot{q}_t \tag{2}$$

$$\underline{q}_t \le q_t \le \overline{q}_t,\ \underline{\dot{q}}_t \le \dot{q}_t \le \overline{\dot{q}}_t, \tag{3}$$

$$sdf(q_t) \ge 0, \tag{4}$$

where $$q_t^{ref}$$

is a linear interpolation between $q_s$ and $q_g$ with T steps. (2) is dynamics of object pose and (3) is a bound of variables.

sdf is a signed distance function between the object 103 and the environment 1113 which computes a distance between $$e_t^v$$

and the environment 113. None of the constraints in (1)-(4) involve any integer variables and thus the optimization problem given by (1)-(4) is formulated as a non-linear program (NLP), which can be solved quickly.

After solving the optimization problem given by (1)-(4), a binary map A can be computed. The binary map A indicates if each extrinsic contact point of the object, $$e_t^v,$$

makes contact with the environment. Similarly, a binary map B to tell which of the extrinsic contact points slip can be computed. Note that this helps us consider the correct friction cone constraints for downstream optimization. $x_{kin}$: $=[q_t, A, B, \forall t]$ represents a solution of the optimization problem (1)-(4).

C-TRAJOPT

Based on the feasible trajectory of the pose of the object 103 and the extrinsic contact points between the object 103 and the environment 113, the C-TRAJOPT 121 determines, the extrinsic contact forces corresponding to the extrinsic contact points, the object surfaces where the robot 101 makes contact, the robot contact points between the robot 101 and the object 103, and the robot contact forces at the robot contact points, by solving the following optimization problem:

$$\text{Find } p_t^i, u_t^i, f_t^v, \lambda_t^{i,p}, z_t^{i,p}, \forall\, t, i, v, p \tag{5}$$

$$\text{s.t., } p_{t+1} = p_t + h\dot{p}_t \tag{6}$$

$$\underline{\dot{p}_t^i} \le \dot{p}_t^i \le \overline{\dot{p}_t^i}, \tag{7}$$

$$u_t^i = \sum_{p=1}^{N_p} {}^W_p R \lambda_t^{i,p} \tag{8}$$

$$p_t^i \in Q_{surface} \cap Q_{mom} \tag{9}$$

$$\lambda_t^{i,p} \in Q_{stable} \cap Q_{surface} \cap Q_{force} \cap Q_{mom} \cap Q_{FC} \cap Q_C \tag{10}$$

$$f_t^v \in Q_{force} \cap Q_{mom} \cap Q_{FC} \tag{11}$$

$$z_t^{i,p} \in Q_{surface} \cap \in Q_{stable} \cap Q_C \tag{12}$$

where $Q_{surface}$, $Q_{force}$, $Q_{mom}$, $Q_{stable}$, $Q_{FC}$, and $Q_C$ are a set encoding object surface selection constraint, force balance constraint, moment balance constraint, stable contact change constraint, friction cone constant, and integer constraint, respectively. Each set is explained below. (6) is dynamics of the robot contact points and (7) considers a bound of robot velocity.

The optimization problem (5)-(12) is formulated as a mixed-integer non-convex QCQP due to a bilinear term in $Q_{mom}$, which is in general quite tough to find a feasible solution. Thus, some embodiments propose the convex relaxation of bilinear terms such that optimization problem (5)-(12) is formulated as a mixed-integer linear programming (MILP), which is easier to find a feasible solution while improving the computational complexity. Solving the optimization problem (5)-(12) returns $$x_{con} := \left[p_t^i, u_t^i, f_t^v, \lambda_t^{i,p} z_t^{i,p}, \forall\, t, i, v, p\right].$$

Q-TRAJOPT

The Q-TRAJOPT 123 determines the optimal trajectory that includes the optimal outputs, for each time step, including the optimal extrinsic contact forces, the optimal robot contact points between the robot 101 and the object 103, the optimal robot contact forces at the optimal robot contact points, and the optimal object pose, while fixing $$z_t^{i,p}$$

and the binary map A, by solving the following optimization problem:

$$\min_{q_t, \dot{q}_t} \sum_{t=0}^{T} \left\| q_t - q_t^{ref} \right\|_{Q_{kin}}^2 \tag{13}$$

$$\text{s.t., (2), (3), (6)} - (11) \tag{14}$$

$$\lambda_t^{i,p} \in Q_{slip},\ f_t^v \in Q_{slip},\ \dot{p}_t^i \in Q_{slip},\ \dot{e}_t^v \in Q_{slip} \tag{15}$$

where $Q_{slip}$ encodes the sticking-slipping complementarity constraints 139. Since the object surfaces where the robot makes contact is fixed, the optimization problem (12)-(14) becomes NLP, which can be solved quickly.

Convex Relaxation of Bilinear Terms/Constraints

It is an objective of some embodiments to achieve a tighter approximation of the bilinear terms than naive McCormick envelope relaxation but do not want to increase the computation burden. A bilinear constraint xy, where $x \in \{x^L, x^U\}$ and $y \in \{y^L, y^U\}$ is considered.

Using the McCormick envelope, the following relaxation of the bilinear constraints is considered $$W = \left\{ w, x, y, x^L, x^U, y^L, y^U \;\middle|\; \begin{array}{c} w \ge x^L y + y^L x - x^L y^L, \\ w \ge x^U y + y^U x - x^U y^U, \\ w \le x^U y + y^L x - x^U y^L, \\ w \le x^L y + y^U x - x^L y^U \end{array} \right\} \tag{16}$$

where w is used to represent xy.

A tighter relaxation is obtained by partitioning the domain. Here, C-regions are considered by introducing binary variables, $\eta_c$, c=1, . . . , C for each partition.

Then, the partitioned McCormick envelopes are given by.

$$\sum_{\{c=1,\cdots,C\}} \eta_c = 1 \tag{17}$$

$$\{\eta_c = 1\} \Longrightarrow W\left(w, x, y, x_c^U, x_c^L, y_c^U, y_c^U\right) \tag{18}$$

$$\{\eta_c = 1\} \Longrightarrow x_c^L \le x \le x_c^U,\ y_c^L \le y \le y_c^U, \tag{19}$$

However, this approach requires O(C) binary variables, leading to scalability issues.

The binary encoding technique assigns each option a unique binary code, reducing the number of binary variables from O(C) to O(log C).

Let $K := \log_2 C$ and binary variable, $v_k = 1$, k=1, . . . , K.

Each region c corresponds to a unique binary code, ($d_{c1}$, $d_{c2}$, . . . , $d_{cK}$), where $d_{ci} \in \{0, 1\}$ $d_{ci}$ is the ith bit of the binary code for region c.

Further, auxiliary continuous variables $s_{ci} \in [0, 1]$ are introduced for each region. The resulting formulation using binary encoding is as follows.

$$|v_k - d_{ck}| \leq s_{ck} \leq M(v_k + d_{ck} - 2v_k d_{ck}),\ \sum\nolimits_{k=1}^{K} s_{ck} = \eta_c \tag{20}$$

$$\eta_c = 0 \Longrightarrow \{W(w, x, y, x_c^U, x_c^L, y_c^U, y_c^U),\ x_c^L \leq x \leq x_c^U,\ y_c^L \leq y \leq y_c^U\} \tag{21}$$

where M is a large positive number. η used in (20)-(21) are continuous variables.

Figure 3A:
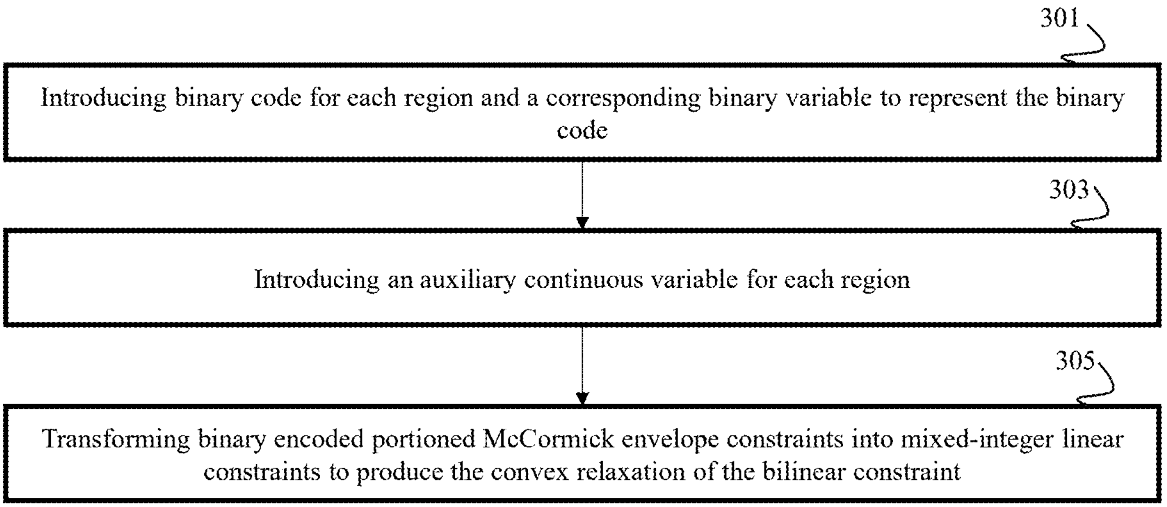
FIG. 3A illustrates a method for convex relaxation of bilinear constraints, according to some embodiments of the present disclosure.

FIG. 3A illustrates a method 300 for the convex relaxation of the bilinear constraints, according to some embodiments of the present disclosure. The C-TRAJOPT module 207*b* utilizes the convex relaxation of the bilinear constraints to model interactions between the robot contact forces and the object surfaces. At block 301, the method 300 includes introducing binary code for each region and the corresponding binary variable to represent the binary code. At block 303, the method 300 includes introducing the auxiliary continuous variable for each region. At block 305, the method 300 includes transforming binary encoded portioned McCormick envelope constraints into mixed-integer linear constraints to produce the convex relaxation of the bilinear constraint.

Feedback Cutting Plane with Infeasible Solutions

Figure 3B:
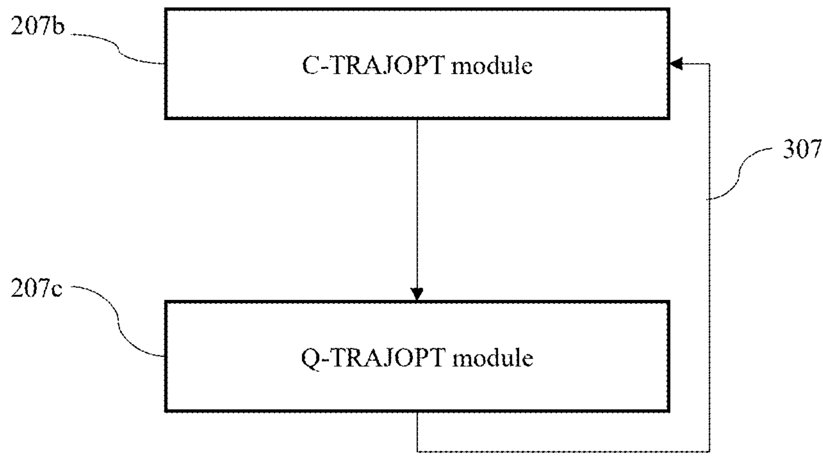
FIG. 3B illustrates a feedback mechanism in context of infeasible solutions, according to some embodiments of the present disclosure.

FIG. 3B illustrates a feedback mechanism in context of infeasible solutions, according to some embodiments of the present disclosure. Some embodiments are based on the recognition that the Q-TRAJOPT 123 may find infeasible solutions, i.e., an infeasible optimal trajectory. In such a case, the robot contact points from the C-TRAJOPT 121 that lead to the infeasible solution are removed, and the C-TRAJOPT 121 and the Q-TRAJOPT 123 re-run. As a consequence, the Q-TRAJOPT 123 has a much higher chance of finding feasible solutions. In particular, in some embodiments, if the optimal trajectory determined by the Q-TRAJOPT module 207*c* is infeasible, the processor 205 removes the robot contact points from the C-TRAJOPT 121 that lead to the infeasible optimal trajectory and re-executes 307 the C-TRAJOPT module 207*b* and the Q-TRAJOPT module 207*c* to find the optimal trajectory.

For instance, i-th robot makes contact at object surface p at t if $$z_t^{i,p} = 1$$

and the robot 101 does not make contact otherwise. To achieve this:

$$\sum\nolimits_{t \in \mathcal{T}, i \in \mathcal{I}, p \in \mathcal{P}} z_t^{i,p} \leq N - 1 \tag{22}$$

where $\mathcal{T}, \mathcal{I}, \mathcal{P}$ indicate a set of indices where $$z_t^{i,p} = 1$$

and N is a total number of indices with $$z_t^{i,p} = 1.$$

(22) means that at least one of $$z_t^{i,p} = 1$$

in $\mathcal{T}, \mathcal{I}, \mathcal{P}$ needs to be zero.

Constraints

1. Quasi-Static Equilibrium:

In an embodiment, the quasi-static equilibrium is given as follows.

$$a.\ Q_{force} = \{f^v, \lambda^{i,p} \mid F(f^v, \lambda^{i,p}, q, mg) = 0\}, \tag{23}$$

$$b.\ Q_{mom} = \{f^v, \lambda^{i,p}, p^i \mid G(f_t^v, \lambda^{i,p}, q, mg, p^i, e^v) = 0\} \tag{24}$$

where F and G represent static equilibrium of force and moment, respectively.

2. Making-Breaking Contact:

For each robot contact, following hybrid contact models are considered.

$$Q_C = \left\{ z^{i,p}, \lambda_n^{i,p}, p^i \middle| \begin{array}{c} \{z^{i,p} = 0\} \Rightarrow \lambda_n^{i,p} = 0, \\ \sum\nolimits_p^{N_p} z^{i,p} = 1, \\ \{z^{i,p} = 1 \Rightarrow p^i \in \mathcal{P}_p \end{array} \right\} \tag{25}$$

(25) means that 1) a normal force at p-th surface is zero if there is no contact, 2) the robot 101 makes contact at one of the object surfaces including the case where $$\lambda_n^{i,p} = 0,$$

and 3) the robot contact point is bounded in $\mathcal{P}_p$ if the contact is made.

3. Friction Cone:

Some embodiments of the present disclosure consider a coulomb friction model:

$$Q_{FC} = \{f^v, \lambda^{i,p} \| \lambda_s^{i,p}| \leq \mu_r^i \lambda_n^{i,p}, |f_s^v| \leq \mu_e^v f_n^v\} \tag{26}$$

4. Stable Contact Change Constraint

Although tabletop manipulation such as sliding can change contact anytime since stability of the object 103 is always maintained, the robot 101 cannot change the contact anytime when working on non-tabletop manipulation such as pivoting since the stability is not always maintained. The C-TRAJOPT 121 takes into account the change of contact stably.

Some embodiments are based on the realization that the robot 101 can safely change the contact when (23) and (24) are satisfied with zero robot forces at t and $$t+1\left(\text{i.e., } \lambda_t^{i,p} = \lambda_{t+1,n}^{i,p} = 0\right).$$

Following different scenarios are possible.

1. The robot 101 does not make contact at p-th object surface between t and $$t+1\left(\text{i.e., } \lambda_t^{i,p} = \lambda_{t+1}^{i,p} = 0\right).$$

2. The robot 101 changes the contact $$\left(\text{i.e., } z_t^{i,p} + z_{t+1}^{i,p} = 1\right).$$

3. The robot 101 keeps making contact $$\left(\text{i.e., } z_t^{i,p} + z_{t+1}^{i,p} = 2\right).$$

Thus, the constraint is imposed such that $$\lambda_{t,n}^{i,p} = \lambda_{t+1,n}^{i,p} = 0$$

when the first scenario happens, which can be implemented as mixed-integer linear constraints.

5. Sticking-Sliding Contact

The Q-TRAJOPT 123 considers sticking-sliding contact. For each contact, $f^v$, $\lambda^{i,p}$, $$\dot{p}_t^i, \dot{e}_t^v$$

are constrained through complementarity constraints to model sticking-sliding contact.

Figure 4:
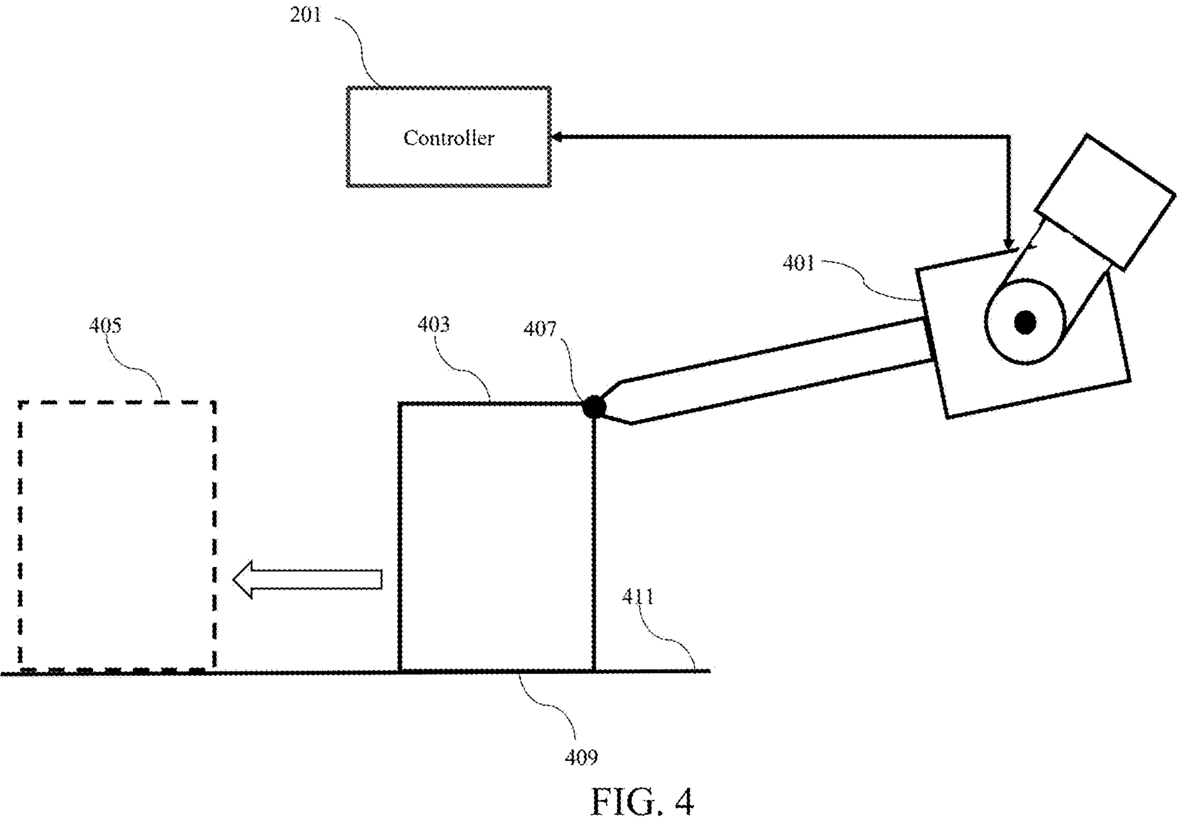
FIG. 4 illustrates a manipulation task of pushing an object to a target location, according to an embodiment of present disclosure.

Some embodiments are based on the realization that the controller 201 can be used to control a manipulation task of pushing an object to a target location. FIG. 4 illustrates the manipulation task of pushing an object 403 to a target location 405, according to an embodiment of present disclosure. A robotic arm 401 is communicatively coupled to the controller 201. The manipulation task of pushing the object 403 to the target location 405 leads to contact formations, such as, a contact 407 between the robotic arm 401 and the object 403, and a contact 409 between the object 403 and an environment 411. The controller 201 determines an optimal trajectory for executing the manipulation task by executing the modules of the hierarchical optimization framework 117, as described above in FIGS. 1C-1E and FIG. 2. Further, the controller 201 controls the robotic arm 401 based on the determined optimal trajectory, causing the robotic arm 401 to push the object 403 to the target location 405.

Likewise, the controller 201 can be used for re-orientation of objects of different size and shape based on the hierarchical optimization framework 117.

Figure 5A:
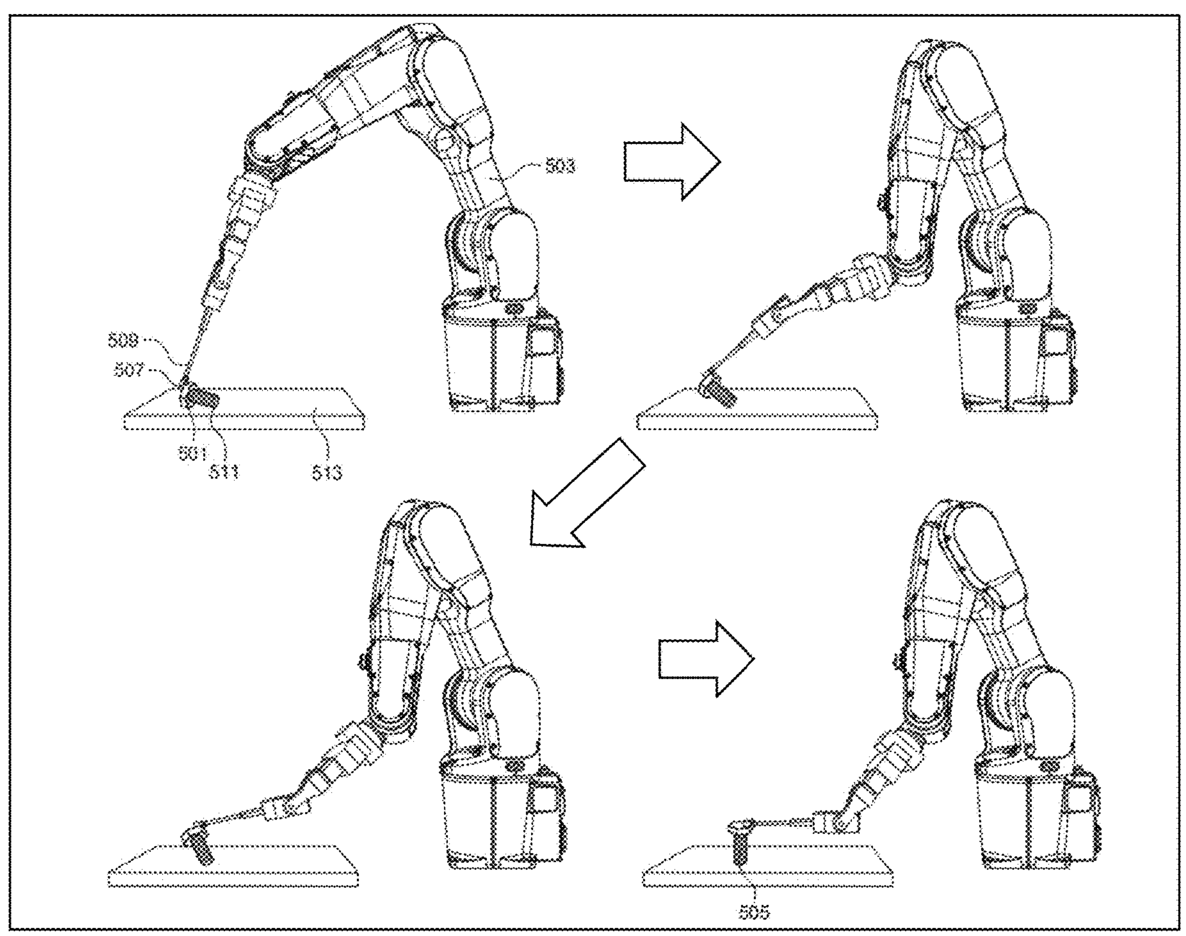
FIG. 5A illustrates re-orientation of a bolt, according to some embodiments of the present disclosure.

FIG. 5A illustrates re-orientation of a bolt 501, according to some embodiments of the present disclosure. The controller 201 (not shown in figure) is communicatively coupled to a robotic arm 503. As can be seen from FIG. 5A, the controller 201 controls the robotic arm 503 such that the bolt 501 is moved to a target pose 505, without losing a contact 507 between a tool 509 held by the robotic arm 503 and the bolt 501 and a contact 511 between the bolt 501 and an environment 513.

Figure 5B:
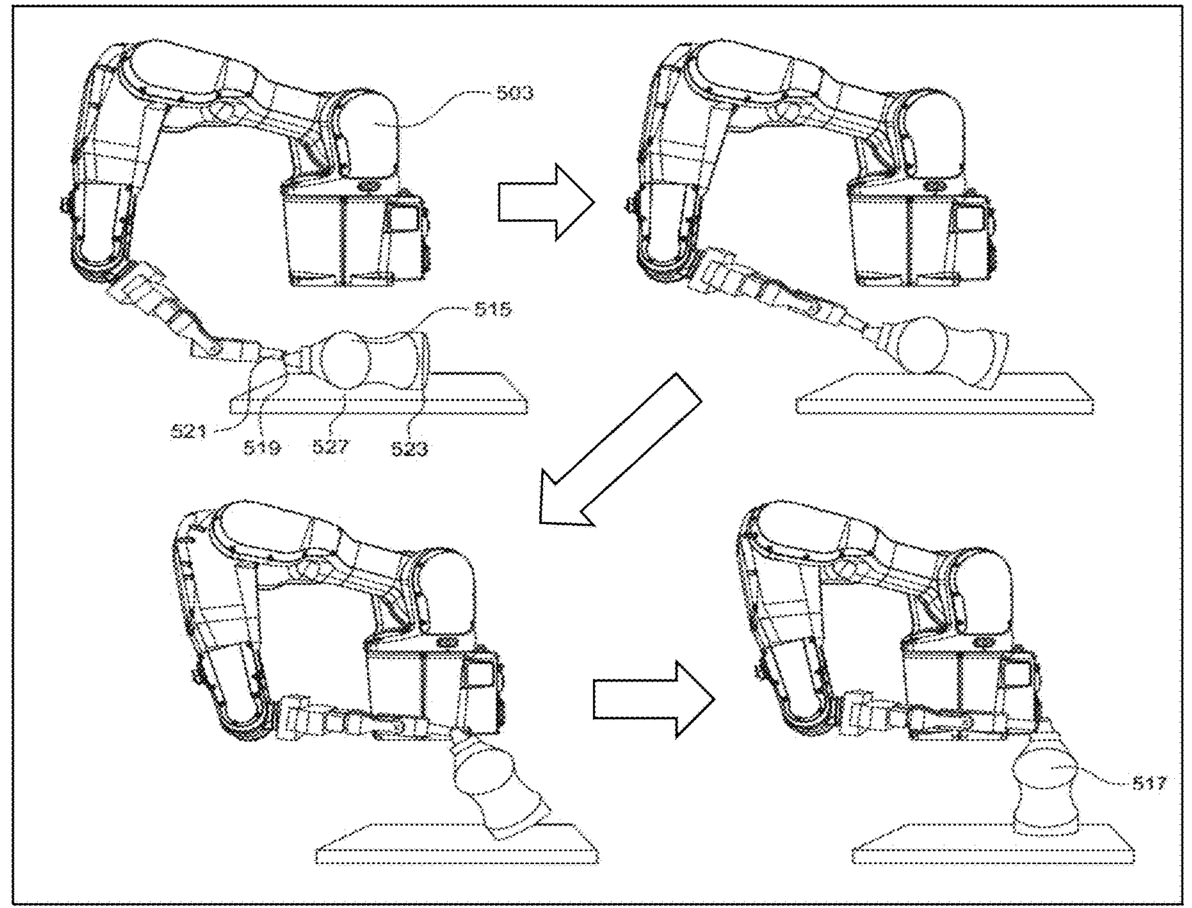
FIG. 5B illustrates re-orientation of a bottle, according to some embodiments of the present disclosure.

FIG. 5B illustrates re-orientation of a bottle 515, according to some embodiments of the present disclosure. As can be seen from FIG. 5B, the controller 201 (not shown in figure) controls the robotic arm 503 such that the bottle 515 is moved to a target pose 517, without losing a contact 519 between a tool 521 held by the robotic arm 503 and the bottle 515 and a contact 523 between the bottle 515 and an environment 527.

Since the controller 201 can control the robotic arm 503 to manipulate objects of different size and shape, such as the bolt 501 and the bottle 515, the controller 201 can be used to control the robotic arm 503 to perform objects arrangement task.

Figure 5C:
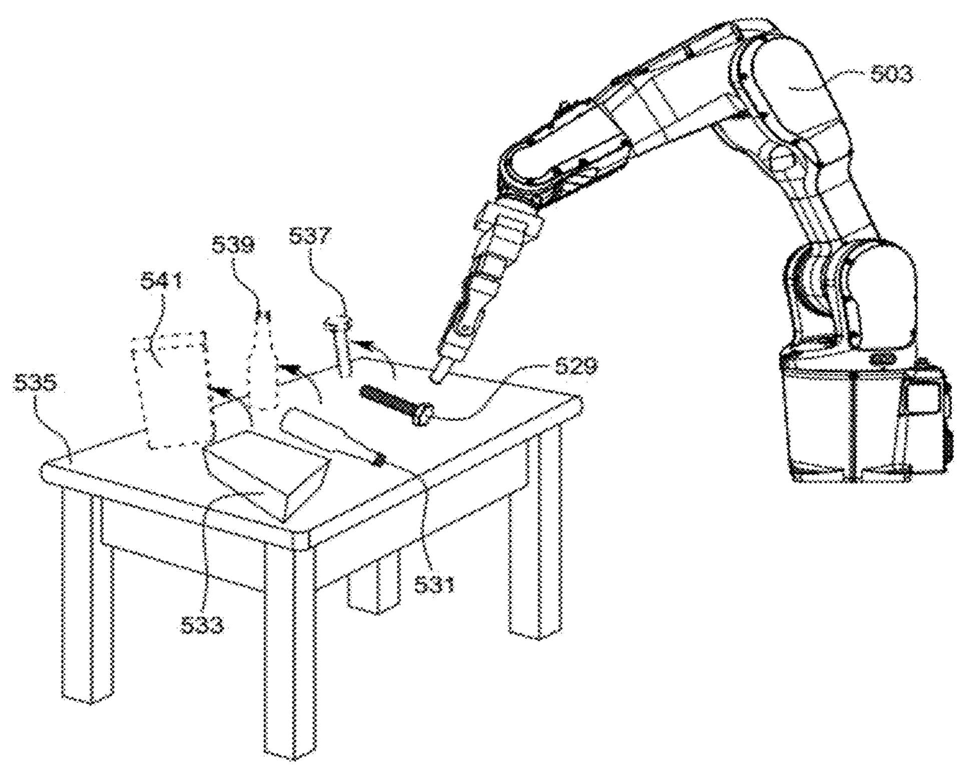
FIG. 5C illustrates an objects arrangement task, according to some embodiments of the present disclosure.

FIG. 5C illustrates an objects arrangement task, according to some embodiments of the present disclosure. Objects, such as a bolt 529, a bottle 531, and a box 533, are situated on a table 535. The controller 201 controls the robotic arm 503 to move each object to its respective target pose, to arrange the objects on the table 535. For example, the bolt 529, the bottle 531, and the box 533 are moved to target poses 537, 539, and 541, respectively. To that end, the controller 201 can arrange each object according to its respective target pose, irrespective of an initial pose of each object.

Additionally, based on the hierarchical optimization framework 117, the controller 201 can be used determine an optimal trajectory to handle the object to assemble the object for manufacturing a product using one or a combination of pushing, reorienting, and gripping the object. Such an embodiment is described below in FIG. 5D.

Figure 5D:
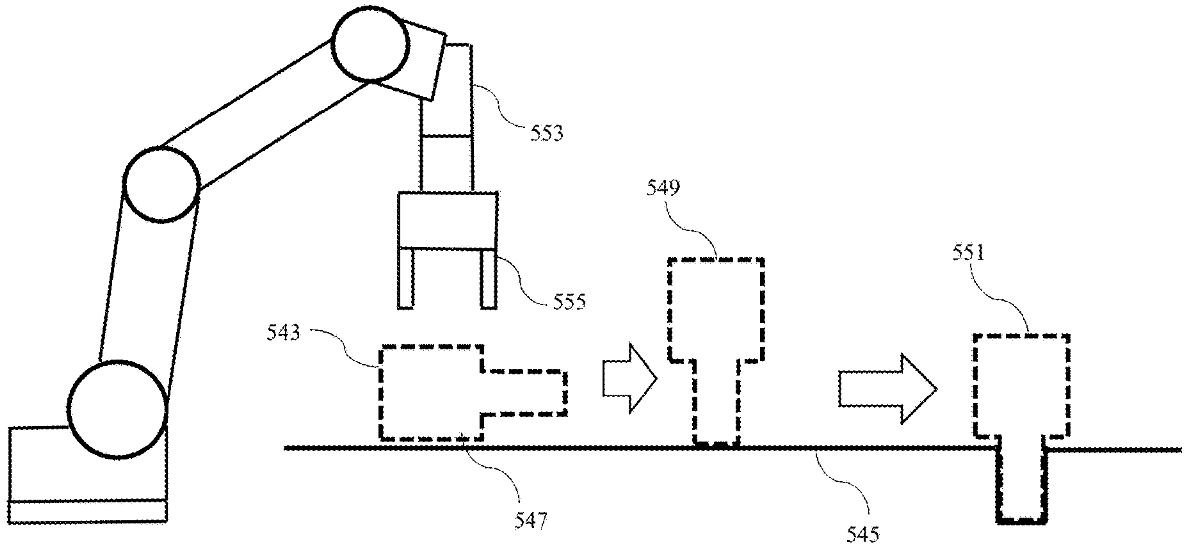
FIG. 5D illustrates an assembly task, according to some embodiments of the present disclosure.

FIG. 5D illustrates an assembly task, according to some embodiments of the present disclosure. The object, such as a peg 543 is placed on a tabletop surface 545 with partially known friction coefficients. An assembly task includes manipulating the peg 543 in an initial pose 547 to a pose 549, and then to a target pose 551. The controller 201 controls robotic arm 553 and gripper 555 such that the gripper 555 holds the peg 543, and reorients it to the pose 549 and then to the target pose 551, so that the assembly task is performed.

Figure 6:
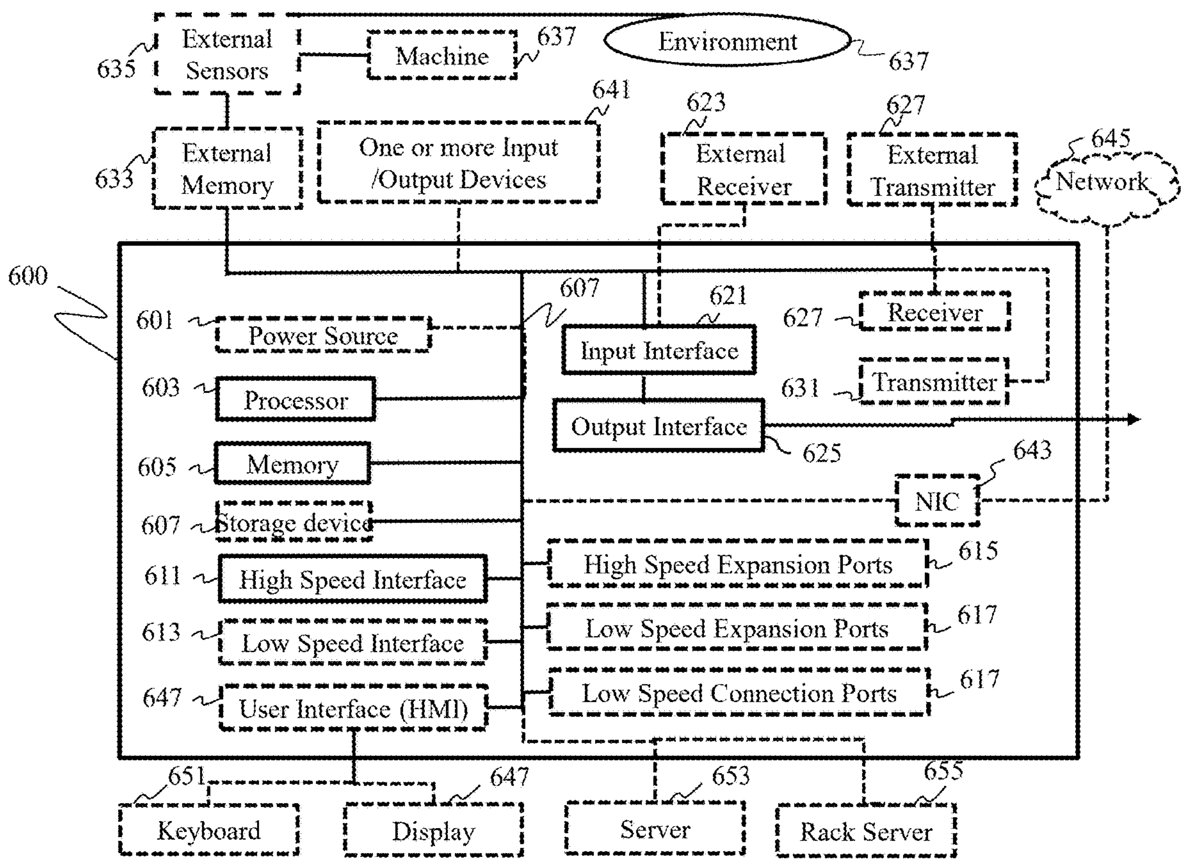
FIG. 6 is a schematic illustrating by non-limiting example a computing apparatus for implementing the methods and the systems of the present disclosure.

FIG. 6 is a schematic illustrating by non-limiting example a computing apparatus for implementing the methods and the systems of the present disclosure. The computing device 600 can include a power source 601, a processor 603, a memory 605, a storage device 607, all connected to a bus 609. Further, a high-speed interface 611, a low-speed interface 613, high-speed expansion ports 615 and low speed connection ports 617, can be connected to the bus 609. In addition, a low-speed expansion port 619 is in connection with the bus 609. Further, an input interface 621 can be connected via the bus 609 to an external receiver 623 and an output interface 625. A receiver 627 can be connected to an external transmitter 629 and a transmitter 631 via the bus 609. Also connected to the bus 609 can be an external memory 633, external sensors 635, machine(s) 637, and an environment 639. Further, one or more external input/output devices 641 can be connected to the bus 609. A network interface controller (NIC) 643 can be adapted to connect through the bus 609 to a network 645, wherein data or other data, among other things, can be rendered on a third-party display device, third party imaging device, and/or third-party printing device outside of the computer device 600.

The memory 605 can store instructions that are executable by the computer device 600, historical data, and any data that can be utilized by the methods and systems of the present disclosure. The memory 605 can include random access memory (RAM), read only memory (ROM), flash memory, or any other suitable memory systems. The memory 605 can be a volatile memory unit or units, and/or a non-volatile memory unit or units. The memory 605 may also be another form of computer-readable medium, such as a magnetic or optical disk.

The storage device 607 can be adapted to store supplementary data and/or software modules used by the computer device 600. For example, the storage device 607 can store historical data and other related data as mentioned above regarding the present disclosure. Additionally, or alternatively, the storage device 607 can store historical data like data as mentioned above regarding the present disclosure. The storage device 607 can include a hard drive, an optical drive, a thumb-drive, an array of drives, or any combinations thereof. Further, the storage device 607 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, the processor 603), perform one or more methods, such as those described above.

The computing device 600 can be linked through the bus 609, optionally, to a display interface or user Interface (HMI) 647 adapted to connect the computing device 600 to a display device 649 and a keyboard 651, wherein the display device 649 can include a computer monitor, camera, television, projector, or mobile device, among others. In some implementations, the computer device 600 may include a printer interface to connect to a printing device, wherein the printing device can include a liquid inkjet printer, solid ink printer, large-scale commercial printer, thermal printer, UV printer, or dye-sublimation printer, among others.

The high-speed interface 611 manages bandwidth-intensive operations for the computing device 600, while the low-speed interface 613 manages lower bandwidth-intensive operations. Such allocation of functions is an example only. In some implementations, the high-speed interface 611 can be coupled to the memory 605, the user interface (HMI) 647, and to the keyboard 651 and the display 649 (e.g., through a graphics processor or accelerator), and to the high-speed expansion ports 615, which may accept various expansion cards via the bus 609. In an implementation, the low-speed interface 613 is coupled to the storage device 607 and the low-speed expansion ports 617, via the bus 609. The low-speed expansion ports 617, which may include various communication ports (e.g., USB, Bluetooth, Ethernet, wireless Ethernet) may be coupled to the one or more input/output devices 641. The computing device 600 may be connected to a server 653 and a rack server 655. The computing device 600 may be implemented in several different forms. For example, the computing device 600 may be implemented as part of the rack server 655.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

We claim:

1. A controller for controlling a robot to execute a manipulation task of manipulating an object to a target pose, comprising:

an input interface configured to receive an initial pose and the target pose of the object;

a memory configured to store modules of a hierarchical optimization framework, the modules of the hierarchical optimization framework comprising:

a kinematics trajectory optimization (K-TRAJOPT) module configured to determine, based on the initial pose and the target pose of the object, a kinematically feasible trajectory of pose of the object and extrinsic contact points between the object and an environment for different poses of the object while satisfying a collision constraint;

a contact trajectory optimization (C-TRAJOPT) module configured to refine the kinematically feasible trajectory by introducing contact forces the robot applies to surfaces of the object and using extrinsic contact points between the object and the environment; and a quasi-static trajectory optimization (Q-TRAJOPT) module configured determine an optimal trajectory by further refining the refined trajectory provided by the C-TRAJOPT module, by incorporating nonlinear dynamic constraints and sticking-sliding complementarity constraints; and a processor configured to:

execute the modules of the hierarchical optimization framework to obtain the optimal trajectory for executing the manipulation task;

produce control commands for actuators of the robot based on the optimal trajectory; and operate the actuators of the robot according to the produced control commands by transmitting the control commands to the robot, to execute the manipulation task.

2. The controller of claim 1, wherein the optimal trajectory includes optimal outputs including optimal extrinsic contact forces between the object and the environment, optimal robot contact points between the robot and the object, optimal robot contact forces at the optimal robot contact points, and optimal object pose.

3. The controller of claim 2, wherein the Q-TRAJOPT module is further configured to determine the optimal extrinsic contact forces between the object and the environment, the optimal robot contact points between the robot and the object, the optimal robot contact forces at the optimal robot contact points, and the optimal object pose, while keeping at least one surface of the object where the robot makes contact fixed.

4. The controller of claim 3, wherein the C-TRAJOPT module is further configured to determine the at least one surface of the object where the robot makes contact.

5. The controller of claim 1, wherein the sticking-sliding complementarity constraints model and enforce interactions between the robot and the environment.

6. The controller of claim 1, wherein the C-TRAJOPT module utilizes a convex relaxation of bilinear constraints to model interactions between robot contact forces and object surfaces.

7. The controller of claim 6, wherein the convex relaxation of the bilinear constraints includes:

introducing a binary code for each region and a corresponding binary variable to represent the binary code;

introducing an auxiliary continuous variable for each region; and transforming binary encoded portioned McCormick envelope constraints into mixed-integer linear constraints to produce the convex relaxation of the bilinear constraint.

8. The controller of claim 1, wherein the target pose of the object includes one or both of a target location and a target orientation of the object, and the initial pose of the object includes one or both of an initial location and an initial orientation of the object.

9. The controller of claim 1, wherein the manipulation task corresponds to pushing of the object, reorientation of the object, gripping the object, or handling the object to assemble the object for manufacturing a product using a combination of pushing, reorienting, and gripping the object.

10. A method for controlling a robot to execute a manipulation task of manipulating an object to a target pose, the method comprising:

receiving an initial pose and the target pose of the object;

determining, based on the initial pose and the target pose of the object, a kinematically feasible trajectory of pose of the object and extrinsic contact points between the object and an environment for different poses of the object while satisfying a collision constraint;

refining the kinematically feasible trajectory by introducing contact forces the robot applies to surfaces of the object and using extrinsic contact points between the object and the environment;

determining an optimal trajectory by further refining the refined trajectory, by incorporating nonlinear dynamic constraints and sticking-sliding complementarity constraints;

producing control commands for actuators of the robot based on the optimal trajectory; and operating the actuators of the robot according to the produced control commands by transmitting the control commands to the robot, to execute the manipulation task.

11. The method of claim 10, wherein the optimal trajectory includes optimal outputs including optimal extrinsic contact forces between the object and the environment, optimal robot contact points between the robot and the object, optimal robot contact forces at the optimal robot contact points, and optimal object pose.

12. The method of claim 11, wherein the method comprises determining the optimal extrinsic contact forces between the object and the environment, the optimal robot contact points between the robot and the object, the optimal robot contact forces at the optimal robot contact points, and the optimal object pose, while keeping at least one surface of the object where the robot makes contact fixed.

13. The method of claim 10, wherein the sticking-sliding complementarity constraints model and enforce interactions between the robot and the environment.

14. The method of claim 10, wherein the method further comprises refining the kinematically feasible trajectory based on a convex relaxation of bilinear constraints to model interactions between robot contact forces and object surfaces.

15. The method of claim 14, wherein the convex relaxation of the bilinear constraints includes:

introducing a binary code for each region and a corresponding binary variable to represent the binary code;

introducing an auxiliary continuous variable for each region; and transforming binary encoded portioned McCormick envelope constraints into mixed-integer linear constraints to produce the convex relaxation of the bilinear constraint.

16. The method of claim 10, wherein the target pose of the object includes one or both of a target location and a target orientation of the object, and the initial pose of the object includes one or both of an initial location and an initial orientation of the object.

17. The method of claim 10, wherein the manipulation task corresponds to pushing of the object, reorientation of the object, gripping the object, or handling the object to assemble the object for manufacturing a product using a combination of pushing, reorienting, and gripping the object.

18. A non-transitory computer-readable storage medium embodied thereon a program executable by a processor for performing a method for controlling a robot to execute a manipulation task of manipulating an object to a target pose, the method comprising:

receiving an initial pose and the target pose of the object;

determining, based on the initial pose and the target pose of the object, a kinematically feasible trajectory of pose of the object and extrinsic contact points between the object and an environment for different poses of the object while satisfying a collision constraint;

refining the kinematically feasible trajectory by introducing contact forces the robot applies to surfaces of the object and using extrinsic contact points between the object and the environment;

determining an optimal trajectory by further refining the refined trajectory provided, by incorporating nonlinear dynamic constraints and sticking-sliding complementarity constraints;

producing control commands for actuators of the robot based on the optimal trajectory; and operating the actuators of the robot according to the produced control commands by transmitting the control commands to the robot, to execute the manipulation task.

19. The non-transitory computer-readable storage medium of claim 18, wherein the method further comprises refining the kinematically feasible trajectory based on a convex relaxation of bilinear constraints to model interactions between robot contact forces and object surfaces.

20. The non-transitory computer-readable storage medium of claim 19, wherein the manipulation task corresponds to pushing of the object, reorientation of the object, gripping the object, or handling the object to assemble the object for manufacturing a product using a combination of pushing, reorienting, and gripping the object.

* * * * *